Figure 1:
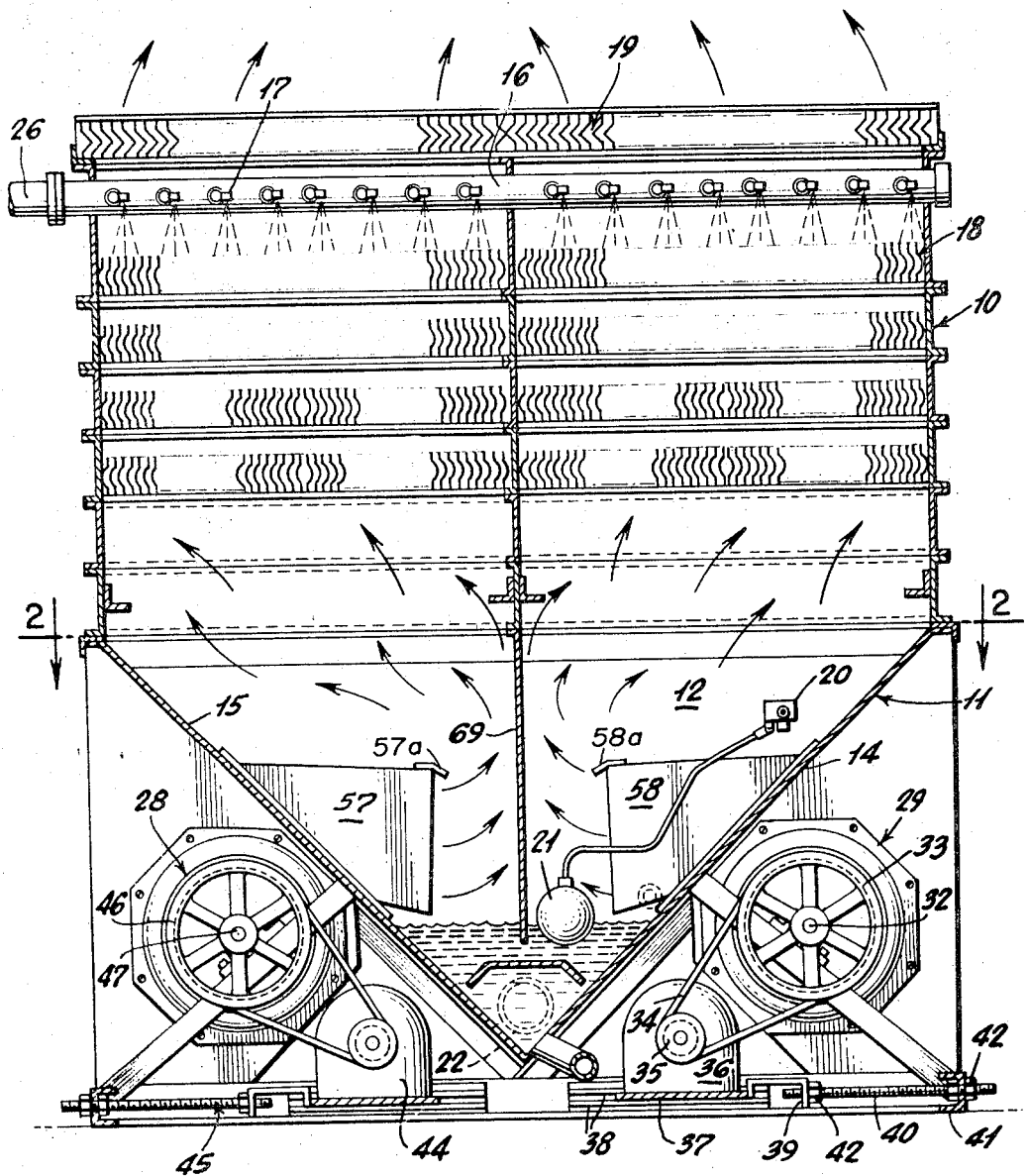

United States Patent

[11] 3,572,657

[72] Inventor  Wilson E. Bradley, Jr.
               Ellicott City, Md.
[21] Appl. No. 830,256
[22] Filed     June 4, 1969
[45] Patented  Mar. 30, 1971
[73] Assignee  Baltimore Aircoil Company, Inc.
               Baltimore, Md.

[54] WATER BAFFLE
     5 Claims, 2 Drawing Figs.
[52] U.S. Cl. .................................................. 261/30,
                                                    261/111
[51] Int. Cl. ..................................................... B01f 3/04
[50] Field of Search ............................................ 261/30,
                      108—111, 116—118, (c.t.); 62/305

[56]            References Cited
            UNITED STATES PATENTS
585,568   6/1897   Greiwe ........................ 261/111X
1,975,945 10/1934  Hopkins ...................... 62/305X
1,981,989 11/1934  Byer ........................... 261/108
2,072,096 3/1937   Collins et al. ................ 261/111
2,147,876 2/1939   Baumann ..................... 261/108
2,916,267 12/1959  McIlvaine .................... 261/115X
3,137,145 6/1964   Henderson et al. ......... 62/305X
3,437,319 4/1969   Engalitcheff, Jr. et al. ... 261/29
3,442,494 5/1969   Engalitcheff, Jr. et al. ... 261/111X Primary Examiner—Tim R. Miles
Attorney—Stevens, Davis, Miller & Mosher ABSTRACT: A blow-through evaporative heat exchange apparatus having a blower section with a wet deck section above it and water baffles on the air fan ducts to prevent water from entering the fans when the air system is not being used.

Patented March 30, 1971

3,572,657

2 Sheets-Sheet 1

INVENTOR
WILSON E. BRADLEY, JR.

BY Stevens, Davis, Miller & Mosher
ATTORNEYS

Patented March 30, 1971

3,572,657

2 Sheets-Sheet 2

INVENTOR
WILSON E. BRADLEY, JR.,

BY
Stevens, Davis, Miller & Mosher
ATTORNEYS

WATER BAFFLE

This invention is an improvement in blowthrough counterflow evaporative heat exchange apparatus, for example of the type which is disclosed in U.S. Pat. No. 3,442,494.

In an evaporative heat exchanger of the blowthrough, counterflow type, water flows downwardly by gravity through the unit while air is caused to flow upwardly under conditions of large air-water interface. A small portion of the water is evaporated and the required heat of vaporization is extracted either directly from the remaining water as in a cooling tower or indirectly from a refrigerant as in the case of an evaporative condenser.

The maximum design cooling capacity of evaporative heat exchangers is based on a given heat load and ambient wet bulb temperature when the air moving device is in operation to drive counterflowing air through the units. Heat dissipation equipment is not always required to operate under maximum duty conditions. For example, the heat load may be reduced or the ambient temperature may be less than design or both may occur at the same time. Under these conditions it is common to operate the evaporative heat exchange equipment without the air moving device in operation. These shut-down periods may be of short duration or very long, depending upon how much the design conditions vary from maximum. During the shut-down period the only air circulation is that caused by convection currents or the falling waters. The heat dissipation during this time is caused by evaporation into the slow moving ambient air and also by conduction through the equipment sidewalls to the ambient. When this form of operation is applied to a blowthrough unit of the type disclosed in U.S. Pat. No. 3,442,494, it is found that gravitating water falling on the top wall of the air supply ducting has a tendency to flow by capillarity around the upper defining edge of the duct mouth and partially into the ducting space to form a source of drops. Of course, during normal operation the air issuing from the duct completely prevents this migration of the water; but under no air conditions these drops, if not prevented from forming, will either splash into the fan region or fall into it. In cold weather icing in the fan may result and this will create difficulties in start-up and result in possible damage to the fan unless prevented. This causes particular difficulty in cyclic operation when the fan is consecutively on-and-off for predetermined lengths of time.

It is an object of the present invention to overcome the foregoing difficulties and to provide an improvement by the use of which evaporative heat exchange apparatus can be operated efficiently during all weather conditions with or without the counterflowing air as load conditions may dictate.

Another object of this invention is to prevent the flow of water into the fan ducting or fans of a blowthrough evaporative heat exchanger thus preventing icing of the fans so that they may be efficiently and safely started at intermittent intervals during cyclic operation even under subfreezing temperature conditions.

Figure 2:
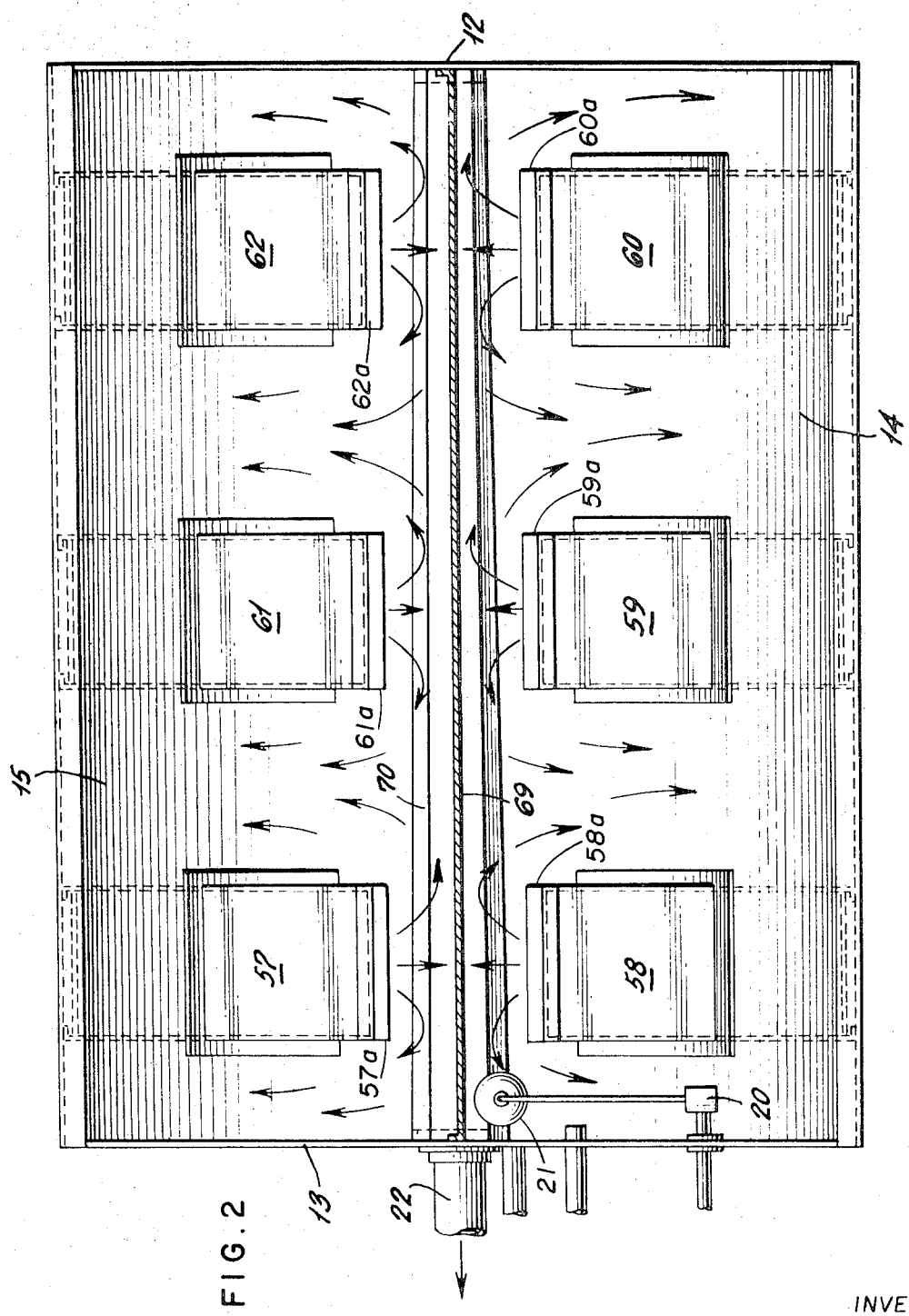

Other objects and advantages of this invention will be apparent upon consideration of the following detailed description of several embodiments thereof in conjunction with the annexed drawings wherein:

FIG. 1 is a view in side elevation of a cooling tower of the type described in U.S. Pat. No. 3,442,494 incorporating a preferred embodiment of the present invention; and FIG. 2 is a view in horizontal section taken along the line 2—2 of FIG. 1.

Referring now to the drawings in greater detail, the cooling tower illustrated is comprised of an upper portion 10 (in which the water is cooled) and a lower sump portion in the form of a V trough or container 11 in which the cooled water is collected. The upper portion 10 is rectangular in plan and is made up of a number of frames superimposed in registry to define four vertical sidewalls.

The lower part of sump section 11 has two vertical opposite walls 12 and 13 in the plane of two of the sidewalls of the upper casing section and, between them, walls 14 and 15 disposed at 45° to the vertical, convergent and intersecting to define with the walls 12 and 13 the V-trough 11. Water to be cooled is supplied through manifold 16 and issues from various spray nozzles 17 to fall by gravity through a cooling region containing a wet deck surface section in the form of a large number of sheet metal elements 18 held by frames in horizontally and vertically spaced relation to present to the water, in total, a large surface area. The water, after flowing through the cooling area in contact with the various sheet metal elements 18 falls by gravity into the V-sump 11.

The unit illustrated in the drawings is provided with centrifugal blowers which, by means to be hereinafter more fully described, cause air to flow upwardly between the surface elements 18 countercurrent to the gravitating water, whereby some of the water is evaporated and carried upwardly with the flowing air to leave the unit through mist eliminators 19 arranged at the top thereof. The heat extracted from the remaining water is, of course, carried with the exhausting air to the ambient atmosphere. As previously stated, the cool water falls to the sump. Makeup water enters through valve 20 opened by float 21 (see FIG. 2) and replaces the evaporated water and any waste water which has been drained to reduce contamination, etc.

The cooled water is withdrawn from the sump 11 through a conduit 22 and delivered by a pump to a point of use such as the heat exchanger. After use, the water has taken on heat and must be returned to the cooling tower for cooling. This return is effected through conduit 26 leading to manifold 16.

Not only does the V-bottom of the sump reduce the amount of the water inventory, but it also permits locating of the blowers substantially within a vertical projection of the rectangular plan of the unit and because of its V-shape promotes static pressure increase in the sump section.

In the illustrated apparatus there are two sets of three centrifugal blowers each, a left-hand set, as viewed in FIG. 1, the nearest blower of which bears reference numeral 28, and a right-hand set, also as viewed in FIG. 1, the nearest blower of which bears reference numeral 29. Blower 29 and the two blowers behind it are keyed to a common drive shaft 32 to which there is also keyed a sheave 33 connected by multiple belts 34 to a drive sheave 35 of an electric motor 36. Motor 36 is mounted on a base plate 37 slidable in tracks 38. Connected to base plate 37 is a bracket 39 having a threaded stud 40 passing through it. This stud also passes through a U-section piece 41 which is the bottom piece of framework of the blower and motor support system. The stud 40 is provided with nuts 42 by adjustment of which on the stud 40 the motor mount may be easily shifted and held to control the tension on belts 34.

An arrangement identical to that just described is provided for the blower 28 and the two blowers behind it. In this case the motor bears numeral 44, the belt adjusting assembly 45, and belt sheave 46, the common drive shaft 47.

All of the centrifugal blowers, such as blowers 28 and 29, are of the axial intake, radial discharge type. The individual blowers are spaced apart, and shaft bearings are located on each end of a group of blowers.

The outlet side of each blower, such as 28 and 29, is connected to air ducting which passes through the respective sloping wall 15, 14 of the pan section and terminates in a mouth lying nearly in a vertical plane but sloping slightly in a direction opposite to the slope of the respective wall 14 or 15 through which the ducting passes. The ducting associated with blower 29 includes a portion 58 lying wholly within the sump 11. Blower 28 is provided with a duct portion 57 within the sump. In FIG. 2 ducting portions 59 and 60 within the sump 11 serve the unnumbered two blowers which lie behind blower 29 and ducting portions 61 and 62 within the sump 11 serve the two unnumbered blowers which lie behind blower 28 as it is viewed in FIG. 1. These duct portions are all of identical construction. The air path defined between the blower and the mouth of each duct portion 58 to 62, inclusive, is of progressively increasing cross-sectional area in the direction of air-flow so that a considerable measure of conversion of velocity pressure to static pressure is accomplished between the cutoff of the blower and the mouth of the ducting system.

In FIGS. 1 and 2, above the mouth of each of the ducts 57 to 62, inclusive, there is located a water baffle, these baffles bearing numerals 57a to 62a respectively and constituting exemplifications of the present invention. As can be seen best by reference to FIG. 2, the baffles 57a to 62a extend for the width of the top of the respective ducting and each water baffle projects forward of the ducting mouth. Note too that each of the baffles 57a to 62a is so bent that the downstream edge thereof is lower than the upstream edge. See in this regard FIG. 1.

These baffles 57a to 62a are provided to deal with the problem which arises when the system is operated without counterflow air as is the case in cool weather or under other circumstances when the equipment is dealing with a low heat load. Under these conditions water is supplied as usual from the nozzles 17 but no air is blown from the ducts 57 to 62, inclusive. Unless baffles such as those which bear numerals 57a to 62a are used, water falling on the top wall of the ducting will flow by capillarity around the upper defining edge of the duct mouth, partially into the ducting space to form a source of drops. These drops, if not prevented from forming, will either splash into the fan region by reason of striking some other part of the equipment or, in some instances, may fall into the fan region directly. In cold weather icing in the fan may result and this will create difficulties in start-up and result in possible damage to the fan unless prevented. The water baffles provided solve the problem.

These baffles are also very efficient when the air moving device is in operation. Even though the air velocity issuing from the ducting mouth is at high velocity the design and small size of the baffles does not cause added turbulence that would increase the system air resistance and cause a loss of air quantity.

Also important to the unit cooling capacity during fan operation is the fact that the baffles permit the water to continue to run off the front of the discharge duct and mix with the high velocity airstream issuing therefrom. An angle or dam across the top of the ducting would not allow this water flow necessary to achieve design cooling capacity.

The sump or pan section 11, as illustrated in FIG. 1, is centrally divided by a partition 69 which extends between walls 12 and 13 and from the top of the pan section downwardly somewhat below the water level of the sump. Below the lower end of the partition 69 there is located an air-antientrainment baffle 70 which extends horizontally across the bottom of the sump above the level of outlet pipe 22. The plate 70 also functions to equalize the withdrawal of water from the sump 11, since it is tapered to present a wider opening for water passage on the end remote from the outlet. Directly above the air-antientrainment baffle 70 there can be located a strainer supported by appropriate brackets.

Although the above description is chiefly concerned with evaporative heat exchangers of the cooling tower type, it should be understood that its features and concepts could be adapted to all blowthrough evaporative heat exchangers such as evaporative condensers, liquid coolers, gas coolers, etc.

The invention may be embodied in other specific forms without departing from the spirit or essential characteristics hereof. The embodiment and the modification described are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a blowthrough evaporative heat exchanger including a blower, means defining a region for the introduction of air, means to gravitate water throughout substantially all of the cross section of said region, air guiding means extending from said blower into said region, said guiding means including an upper wall in a position to be impinged upon by on the end of and extending below said water baffle being small in relation to the cross section of the air guiding means.

2. The apparatus as claimed in claim 1 in which said baffle has a brake therein such that the outer end is lower than the inner end thereof.

3. In a blowthrough evaporative heat exchanger including a blower, means defining a region for the introduction of air, means to gravitate water throughout the cross section of said region, ducting extending from said blower into said region in a position to be impinged upon by said water, said ducting including a water baffle extending from its upper wall and projecting beyond and below the end of said upper wall within said region, the area of said water baffle projecting below the end of said upper wall being small in relation to the cross section of the ducting.

4. The apparatus as claimed in claim 3 in which said ducting is of rectangular cross section and said water baffle extends for the full width of the upper wall of said duct.

5. Evaporative heat exchange apparatus comprising a chamber, a region of said chamber having therein surface presenting means for receiving fluid to have heat evaporatively extracted therefrom, means above said region to flow liquid by gravity over said surface presenting means, means defining a V-section sump below said region to receive liquid falling from said surface presenting means, said sump having a wall inclined outwardly from the bottom and a vertical wall at least one of which is part of the sump-defining means, an air blower, ducting leading from the outlet of said blower through said inclined wall and terminating with its mouth facing said vertical wall, a water baffle extending from the upper wall of said ducting and projecting beyond said mouth and below the upper defining edge thereof, the area of said water baffle projecting below the end of said upper wall being small in relation to the cross section of the ducting.

UNITED STATES PATENT OFFICE
CERTIFICATE OF CORRECTION

Patent No. 3,572,657                     Dated     March 30, 1971

Inventor(s)   Wilson E. Bradley, Jr.

It is certified that error appears in the above-identified patent and that said Letters Patent are hereby corrected as shown below:

Claim 1 should appear as shown below:

1. In a blow-through evaporative heat exchanger including a blower, means defining a region for the introduction of air, means to gravitate water throughout substantially all of the cross section of said region, air guiding means extending from said blower into said region, said guiding means including an upper wall in a position to be impinged upon by said water, and a water baffle on the end of and extending below said upper wall, said water baffle being small in relation to the cross section of the air guiding means.

Signed and sealed this 27th day of June 1972.

(SEAL)
Attest:

EDWARD M. FLETCHER, JR.                     ROBERT GOTTSCHALK
Attesting Officer                           Commissioner of P